United States Patent
Hallander et al.

(10) Patent No.: US 8,916,252 B2
(45) Date of Patent: Dec. 23, 2014

(54) STRUCTURAL LONGITUDINAL COMPOSITE JOINT FOR AIRCRAFT STRUCTURE

(75) Inventors: Per Hallander, Linköping (SE); Mikael Petersson, Linköping (SE); Bjorn Weidmann, Borensberg (SE); Tommy Grankäll, Borensberg (SE); Göte Strindberg, Linköping (SE); Pontus Nordin, Linköping (SE); Rustan Önnefors, Linköping (SE)

(73) Assignee: SAAB AB, Linköping (SE)

( * ) Notice: Subject to any disclaimer, the term of this patent is extended or adjusted under 35 U.S.C. 154(b) by 417 days.

(21) Appl. No.: 13/377,068

(22) PCT Filed: Jun. 11, 2009

(86) PCT No.: PCT/SE2009/050719
§ 371 (c)(1),
(2), (4) Date: Dec. 8, 2011

(87) PCT Pub. No.: WO2010/144010
PCT Pub. Date: Dec. 16, 2010

(65) Prior Publication Data
US 2012/0088056 A1    Apr. 12, 2012

(51) Int. Cl.
*B32B 3/14*     (2006.01)
*B32B 7/14*     (2006.01)
(Continued)

(52) U.S. Cl.
CPC ............ *B29C 70/58* (2013.01); *B29C 65/5057* (2013.01); *B29C 66/1142* (2013.01);
(Continued)

(58) Field of Classification Search
USPC .............................................. 428/54, 53, 44
See application file for complete search history.

(56) References Cited

U.S. PATENT DOCUMENTS 3,607,504 A    9/1971   Howard
4,331,495 A    5/1982   Lackman et al.
(Continued)

FOREIGN PATENT DOCUMENTS

DE    10 2007 020 389 A1    11/2008
EP        0287103 A2        10/1988
(Continued)

OTHER PUBLICATIONS

PCT/ISA/210—International Search Report—Mar. 29, 2010.

(Continued)

*Primary Examiner* — Brent O'Hern
(74) *Attorney, Agent, or Firm* — Venable LLP; Eric J. Franklin (57) ABSTRACT

A structural composite part made of pre-impregnated fiber plies. The edges of two adjacent fiber plies are connected via a longitudinal composite joint made structural by a nanostructure arranged within the composite joint. A method of producing a structural composite part made of pre-impregnated fiber plies. The edges of two adjacent fiber plies are connected via a longitudinal composite joint made structural by a nanostructure and an aircraft structure comprising such structural composite parts.

9 Claims, 3 Drawing Sheets

(51) Int. Cl.

| | |
|---|---|
| *B29C 70/58* | (2006.01) |
| *B29C 65/50* | (2006.01) |
| *B29C 65/00* | (2006.01) |
| *B29C 70/30* | (2006.01) |
| *B32B 3/02* | (2006.01) |
| *B32B 5/26* | (2006.01) |
| *B32B 5/28* | (2006.01) |
| *B64C 3/20* | (2006.01) |
| *B64C 3/26* | (2006.01) |
| *B29C 65/48* | (2006.01) |
| *B29K 31/00* | (2006.01) |
| *B29K 63/00* | (2006.01) |
| *B29K 67/00* | (2006.01) |
| *B29K 71/00* | (2006.01) |
| *B29K 79/00* | (2006.01) |
| *B29K 81/00* | (2006.01) |
| *B29K 101/10* | (2006.01) |
| *B29K 101/12* | (2006.01) |
| *B29K 105/06* | (2006.01) |
| *B29K 105/16* | (2006.01) |
| *B29K 307/00* | (2006.01) |
| *B29K 309/02* | (2006.01) |
| *B29K 309/08* | (2006.01) |
| *B29L 31/30* | (2006.01) |

(52) U.S. Cl.
CPC .............. *B29C 66/43* (2013.01); *B29C 66/721* (2013.01); *B29C 70/30* (2013.01); *B32B 3/02* (2013.01); *B32B 5/26* (2013.01); *B32B 5/28* (2013.01); *B64C 3/20* (2013.01); *B64C 3/26* (2013.01); *B29C 65/5014* (2013.01); *B29C 65/5021* (2013.01); *B29C 65/4875* (2013.01); *B29C 65/488* (2013.01); *B29C 66/435* (2013.01); *B29K 2031/00* (2013.01); *B29K 2063/00* (2013.01); *B29K 2067/00* (2013.01); *B29K 2071/00* (2013.01); *B29K 2079/085* (2013.01); *B29K 2081/04* (2013.01); *B29K 2101/10* (2013.01); *B29K 2101/12* (2013.01); *B29K 2105/06* (2013.01); *B29K 2105/167* (2013.01); *B29K 2307/00* (2013.01); *B29K 2309/02* (2013.01); *B29K 2309/08* (2013.01); *B29L 2031/3076* (2013.01); *B29L 2031/3085* (2013.01); *Y02T 50/433* (2013.01); *Y02T 50/43* (2013.01)

USPC .................................. 428/54; 428/44; 428/53

(56) References Cited

U.S. PATENT DOCUMENTS

| | | | |
|---|---|---|---|
| 5,650,229 | A | 7/1997 | Gross et al. |
| 5,827,383 | A | 10/1998 | Campbell et al. |
| 6,689,448 | B2 | 2/2004 | George et al. |
| 6,709,538 | B2 | 3/2004 | George et al. |
| 7,312,274 | B2 | 12/2007 | Millard et al. |
| 7,758,715 | B2 | 7/2010 | Petersson et al. |
| 7,972,430 | B2 | 7/2011 | Millard et al. |
| 8,540,833 | B2 | 9/2013 | Deobald et al. |
| 2003/0183067 | A1 | 10/2003 | Cundiff et al. |
| 2006/0073311 | A1 | 4/2006 | Hogg |
| 2006/0201611 | A1 | 9/2006 | Bruschke et al. |
| 2008/0156934 | A1 | 7/2008 | Guard et al. |
| 2008/0286564 | A1* | 11/2008 | Tsotsis .......................... 428/332 |
| 2008/0302912 | A1 | 12/2008 | Yip et al. |
| 2009/0056868 | A1 | 3/2009 | Basu et al. |

FOREIGN PATENT DOCUMENTS

| | | |
|---|---|---|
| GB | 625778 A | 7/1949 |
| WO | WO-2007/136755 A2 | 11/2007 |
| WO | WO-2008/115301 A2 | 9/2008 |
| WO | WO-2008/157075 A1 | 12/2008 |

OTHER PUBLICATIONS

PCT/ISA/237—Written Opinion of the International Searching Authority—Mar. 29, 2010.
PCT/IPEA/409—International Preliminary Report on Patentability—Jun. 1, 2011.
Meguid et al., Intelligent condition monitoring of aerospace composites: Part I-nano reinforced surfaces & interfaces, International Journal of Mechanics and Material Design, vol. 2, No. 3-4, pp. 183-198 (2005).
Gilbert et al., Nano-Alumina Modified Epoxy Based Film Adhesives, Polymer Engineering and Science, vol. 43, No. 5, pp. 1096-1104 (2003).
Faulkner et al., Study of composite joint strength with carbon nanotube reinforcement, Journal of Material Science, vol. 44, No. 2, pp. 2858-2864 (2009).
Han et al., Enhancing the thermal conductivity and compressive modulus of carbon fiber polymer-matrix composites in the through-thickness direction by nanostructuring the interlaminar interface with carbon black, Carbon, vol. 46, No. 2, pp. 1060-1071 (2008).
Office Action in U.S. Appl. No. 13/377,054 Issued Jun. 20, 2014.

* cited by examiner

STRUCTURAL LONGITUDINAL COMPOSITE JOINT FOR AIRCRAFT STRUCTURE

CROSS-REFERENCE TO RELATED APPLICATIONS

This application is the national phase under 35 U.S.C. §371 of PCT/SE2009/050719 filed 11 Jun. 2009.

TECHNICAL FIELD

The present invention relates to a structural composite part. The present invention also relates to a method for producing the structural composite part.

BACKGROUND ART

Structural composite parts for aircrafts may be produced by mechanical forming or hot drape forming of a blank or stack of layers comprising pre-impregnated fibre plies (pre-preg tapes), each layer having fibres with a specific fibre direction. The stack is produced by laying up in a plane parallel with each other almost edge edge pre-fabricated pre-preg tapes. Between the edges often occurs a gap. The gap will be closed by the next layer laid upon the first layer. This means that longitudinal gaps in each pre-preg tape plane often occurs in the stack and which will weaken the finished structural composite part.

For example, a wing (aircraft structure) may comprise assembled upper and lower shells, beams, wing ribs (three-dimensional structural composite parts). An aileron (aircraft structure) may comprise assembled shell, conic formed beams, radius fillers (three-dimensional structural composite parts). These structural composite parts (with exception of the mentioned radius fillers) are formed of blanks comprising layers of said pre-preg tapes. The pre-preg tape is a pre-impregnated fibre ply having an elongated extension. The pre-preg tape comprises fibres (such as made of carbon, glas, ceramic, organic) which are oriented parallel with each other and extending in said elongated extension. The blank is thus built of a first layer of edge to edge positioned pre-preg tapes having the same fibre direction. A second layer of pre-preg tapes is applied onto the first layer but with a different fibre direction. The second layer also consists of edge edge positioned pre-preg tapes which have been laid up parallel to each other, the edges of two adjacent positioned being close to each other, either creating a gap or an overlap (wherein the excess portion of the pre-preg tape overlapping the other has to be removed before the next layer is applied). The definition of edge edge positioned pre-preg tapes means that the they are in position side by side, i.e. with their longitudinal side edges close to each other and the planes of the pre-preg tapes in one common plane. The pre-preg tapes can be fibre layers impregnated with resin before being placed on a temporary support by means of for example an Automatic Tape Laying-machine. The stack has thus fibre plies in each plane arranged onto each other, with different fibre directions, when comparing one plane with another. The stack is thereafter moved to a forming tool for forming the stack into the three-dimensional shape, or at least a two-dimensional shape. When forming the stack of plies over the forming tool, a force generated from a forming medium (e.g. vacuum bag or rollers) will generate shearing forces onto the stack of plies, wherein the plies (or planes) will slide against each other. This is achieved for avoiding wrinkles in the finished formed three-dimensional structural composite part. The benefit with the gliding effect or sliding between the plies is several, especially the lack of wrinkles. It is desirable to avoid wrinkles and at the same time achieve a reinforced structural composite part.

There is thus a need for a reinforced structural composite part including a number of layers of pre-preg tapes, each layer being composed of (in a common plane) side by side laid pre-preg tapes.

US 2008/0286564 A1 describes a method of building a composite structure having fibre layers in a stack, wherein carbon nanotubes are positioned between the layers for strengthening the stack constituting the composite part. The composite part is thus strengthened by applying the nanotubes between the main planes of the pre-preg tapes, i.e. between two layers, laid upon each other.

Furthermore, the document WO 2007/136755 describes a method of growing nanostructures. The nanostructures are used for building a stack of pre-preg ply layers.

Furthermore, the document WO 2008/115301 describes a composite laminate used in structural applications including a nanostructure interlayer of soft material that provides damping action to reduce noise and vibration.

There is thus a need for a further reinforced structural composite part comprising a first layer with parallel in a common plane applied pre-preg tapes side by side, onto which further a second layer with in a common plane parallel applied pre-preg tapes are arranged. Further is a next layer is positioned onto said second layer and so on. The number of layers also determines the strength. A large number of layers involves however a heavy structural composite part and there is a need to decrease the weight, still maintaining the strength.

Furthermore, there is a need for a cost-effective production of structural composite parts comprising layers of pre-preg plies, wherein the production time is shorter than that of producing prior art.

There is also a need for a cost-effective forming of a stack of pre-preg tapes being laid in layers.

SUMMARY OF THE INVENTION

This has been achieved by a structural composite part.

In this way the structural composite part can have an optimal strength, since the composite joint will be considered as a structural part of the composite part. When laying up a pre-preg stack by means of an automatic tape laying machine (ATL) the pre-impregnated fibre plies are laid side by side in one direction. Thereafter the ATL-machine lays up a second layer of pre-impregnated fibre plies in a different direction, whereby a stack with different fibre directions is built. This procedure proceeds until the required number of fibre directions is achieved and/or required thickness of the structural composite part to be cured is achieved. When laying up the pre-impregnated fibre plies edge edge (i.e side by side) gap between the edges of two adjacent pre-impregnated fibre plies often occur. According to prior art, this gap is filled with pre-preg material from the each other adjoining plies, which material flowing from the edges of the plies filling the gap. Such a self filling makes a non-structural joint. This prior art joint is weakening the structural composite part and may also imply a cost of labour if the edges of the laid up pre-impregnated fibre plies overlap each other, wherein the overlapping edge of the pre-impregnated fibre ply must be cut. According to the present invention eventual excess of the nanostructural composite joint of resin comprising the nanostructure will flow out due to the viscous properties of the same compared with the more solid prior art composite joint having no nanostructure.

There are primarily two ways to achieve the nanostructural composite joint according to the present invention, i.e. applying the nanostructural composite joint between the edge edge laid up pre-impregnated fibre plies after that said pre-impregnated fibre plies have been laid up or applying the nanostructural composite joint to the edge/edges of the respective pre-impregnated fibre ply before the lay-up is performed. The last-mentioned way implies that the viscous properties of the nanostructural composite joint is used when the, prepared with nanostructural composite joint, pre-impregnated fibre plies are laid up edge edge, wherein eventual excess will flow out making each layer of pre-impregnated fibre plies even. Also other methods of laying pre-impregnated fibre plies can be used for achieving said stack, namely for example by hand or by so called Advanced Fibre Placement (AFP).

The reinforced composite joint made structural by the nanostructure arranged within the composite joint will thereby provide the structural composite part a strength in x-, y-, z-direction. The reinforced composite joint will have a reduced thermal linear expansion and the viscosity can be controlled by the amount of nanostructure for an optimal handling of the reinforced composite joint under production.

Gaps thus otherwise not filled in a laminate comprising layers with pre-preg plies according to prior art are by means of the present invention filled with structural nanostructure composite joints, thereby improving the strength of the laminate especially in z-direction. Such a strength increases for example the impact resistance of the structural composite part. The longitudinal structural nanostructure composite joint can be in the form of tape, paste, filling adhesive etc.

By increasing the strength between the edges of two adjacent pre-preg tapes the overall strength is increased meaning that the number of layer can be reduced, still achieving a satisfactory strength, i.e. the thickness of the structural composite part can be reduced, still maintaining the strength, thus saving weight, which is a positive effect for an aircraft.

Several solutions exist today for building a stack of pre-preg tapes having a satisfactory strength in the form of a composite part. However, no one has proposed a solution wherein the gap between the edges of two adjacent pre-preg tapes is filled with a nanostructure composite joint connecting the edges nor has been proposed a finished structural composite part comprising such reinforcing composite joints.

Preferably, the nanostructure primarily is arranged in an outer zone of the composite joint for reinforcement of the interface between the composite joint and the edge of the adjacent joined fibre ply.

Thereby is achieved a structural composite part having a strength also in the area between side by side positioned fibre plies wherein their edges will be strongly connected to each other.

Suitably, the nanostructure comprises nanofibres.

The nanofibres can be of carbon and are micro sized fibres arranged within the composite joint material. The composite joint material can preferably be made of polymer materials, such as polymer resins, epoxy, polymides, bismaleimides, phenolics, cyanatester, PEEK, PPS, Polyester, vinylester, polyester, polyamids, polypropylene etc. and mixtures thereof.

Preferably, the nanostructure comprises nanotubes.

Suitably, the nanostructure comprises nanowires.

Nanowires still belong to the experimental world of laboratories. They can complement/replace nanotubes or nanofibres in certain cases depending on application.

Preferably, the nanostructure has an unidirectional orientation.

This is strengthening the composite part in the z-direction if oriented perpendicular against the plane of the fibre plies. Depending upon which part of an aircraft structure the composite part is dedicated, the nanostructure fibre/tube-orientation of the specific composite joint is predetermined before the application of the latter into the gaps between the edges of two adjacent pre-impregnated fibre plies.

Alternatively, when the nanostructure is oriented in z-direction or parallel with the edge surface of the plies, the nanostructure is arranged for being conductive regarding leading electricity or heat, wherein is achieved that a transmission path can be achieved from the inside of a shell to its outside.

Suitably, the nanostructure is oriented perpendicular against the surface edge of the adjacent joined fibre ply.

In this way the structural composite part is made structural by a nanostructure primarily arranged in the periphery of the nanostructure composite joint for reinforcement of the interface between the composite joint and the adjacent fibre ply. As a whole, the composite part composed of layers of fibre plies laid up in different directions, involving different directions of the longitudinal nanostructure in different layers, will thus be reinforced compared with prior art.

Preferably there is achieved an aircraft structure comprising structural composite parts, which are bonded to each other via a bonding interlayer material to form said aircraft structure.

The aircraft structure, such as a composite integrated structure, as a whole will thus have an optimal impact strength.

This has also been achieved by a method.

Thereby a method is provided for a cost effective production of high strength laminate. The nanostructure reinforced composite joint may be applied onto the edges of the pre-impregnated fibre plies already in the production line for manufacture of the pre-impregnated fibre plies (pre-preg tape). After delivery to the air craft industry the pre-preg tape is unwinded from a storing roller and laid up onto a forming table side by side (edge edge) wherein the nanostructure reinforced edges of the pre-preg tapes will join each other directly edge edge. The production of laminate can be performed cost-effective since tolerances at the pre-preg tape lay-up regarding the edge edge relationship does not have to be too narrow. Even if an overlap will occur, the nanostructure reinforced composite joint overlapping part will flow out due to the nanostructure composite low viscosity.

Preferably, the step of laying up almost edge edge positioned pre-impregnated fibre plies is followed by applying said nanostructure reinforced composite joint in a gap created between the edges of two adjacent pre-impregnated fibre plies.

The longitudinal structural nanostructure composite joint can be in the form of tape, paste, filling adhesive etc. The joint composite joint can be applied directly onto one or both edges of the pre-preg tape before the lay-up for building the stack. The composite joint can also be applied after the lay-up of pre-preg tapes and in the gaps between the laid up pre-preg tapes edges. By using the method of "filing the gap" afterwards, an aircraft producer can control the production line in an effective manner. He can produce traditional aircraft composite parts and structural composite parts using the same pre-preg tape storage reel. If a supply of stronger composite parts is needed, he has just to simple complete the production line with an application of nanostructure composite joint into the gaps between laid up pre-preg tapes for achieving the stronger laminate.

Suitably, the step of providing said nanostructure reinforced composite joint is performed onto at least one of the edges of the pre-impregnated fibre plies before the step of laying up almost edge edge positioned pre-impregnated fibre plies.

In this way an air craft producer can buy "ready to use" composite joints arranged onto the edge/edges of the pre-preg tapes. In the production line, the pre-preg tapes are laid upon each other and between each other edge edge, wherein the nanostructure composite joints connect adjacent pre-preg tapes during the lay-up.

Preferably, the step of forming the stack is performed by a suitable forming method (for example hot drape mechanical forming), wherein the specific longitudinal composite joint extending in the longitudinal direction of the edge edge connected fibre plies controls the forming force for forming the stack. The forming can also be achieved by other forming methods.

Thereby is achieved, when using ATL-machine lay-up, a cost effective production of single and double curved structural composite parts. The forming means that a vacuum bag can be used for achieving a pressure on the stack over a forming tool. Trapped air and wrinkles being forced out under vacuum pressure. If a stronger forming force is required for forming the stack over a specific portion of the forming tool, the stack can be arranged in such way that the lay-up of pre-preg tapes will have one or several of their joined nanostructure reinforced composite joints positioned over that specific portion for easier forming due to the viscosity of the nanostructure composite joint. After fulfilled forming the formed pre-preg stack is cured.

Suitably, the composite joint is arranged with suitable fibre direction (i.e. perpendicular against the plane of a wing shell) in the laminate for conducting electricity and/or heat transverse the shell.

BRIEF DESCRIPTION OF THE DRAWINGS

The present invention will now be described by way of example with reference to the accompanying schematic drawings, of which:

FIG. 10b illustrates an exaggerated view of two joined edges of adjacent pre-preg tapes in FIG. 10a.

DETAILED DESCRIPTION

Hereinafter, embodiments of the present invention will be described in detail with reference to the accompanying drawings, wherein for the sake of clarity and understanding of the invention some details of no importance are deleted from the drawings.

Figure 1:
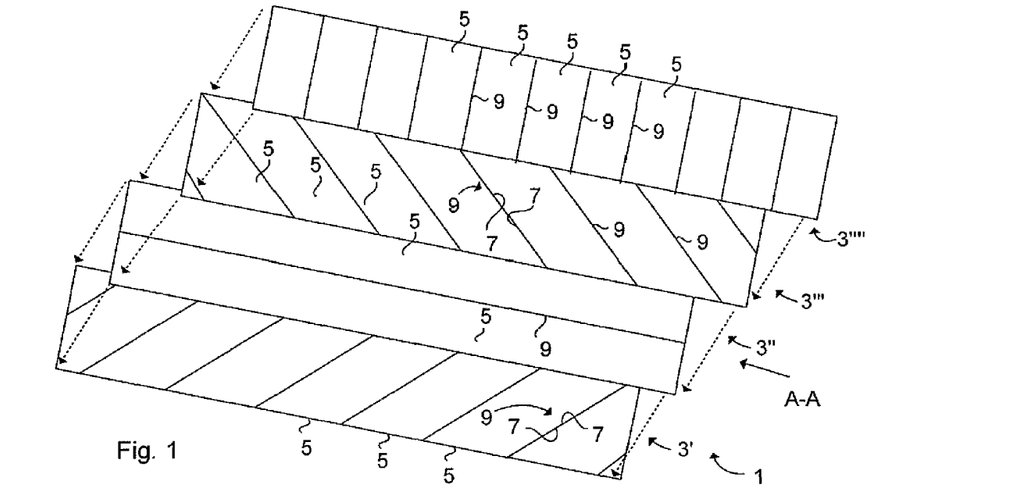
FIG. 1 illustrates four layers of pre-preg tapes in a perspective view taken away from each other.

FIG. 1a schematically illustrates a stack 1 of four layers 3', 3'', 3''', 3'''' of pre-preg tapes 5 (pre-impregnated fibre plies) in a perspective view, which layers 3', 3'', 3''', 3'''' are illustrated taken away from each other. The first layer 3' of parallel laid up pre-preg tapes 5 has the pre-preg tapes 5 oriented in 45 degrees direction relative the longitudinal extension of the stack 1. Each pre-preg tape 5 in the stack being comprised of a polymer material (for example thermoplastic polymer or thermoset polymer) including embedded aligned carbon fibres oriented in the direction of the longitudinal extension of the pre-preg tape 5. This means that the first layer 3' will have aligned fibres (not shown) in a direction 45 degrees relative the stack 1 prolongation. The pre-preg tapes 5 are laid up almost edge 7 to edge 7 in the first layer 3' (as also for the rest of the layers). The edges 7 of two adjacent pre-preg tapes 5 are connected via a longitudinal composite joint 9 extending in the longitudinal direction of the edge 7 edge 7 connected to each other pre-preg tapes 5. The composite joint 9 is made structural by a nanostructure (not shown) arranged within the composite joint 9.

A second layer 3'' has pre-preg tapes 5 with their longitudinal direction oriented in 0 degrees direction relative the longitudinal extension of the stack 1 and is applied onto the first layer 3'. In the illustration two parallel pre-preg tapes 5 are connected edge 7 edge 7 via the further reinforcing nanostructure composite joint 9. A third layer 3''' of 45 degrees oriented pre-preg tapes 5, connected together via reinforcing nanostructure composite joints 9, is applied onto the second layer 3''. Finally, a fourth layer 3'''' of 90 degrees oriented pre-preg tapes 5 is applied onto the third layer 3'''. Also the fourth layer 3'''' being comprised of pre-preg tapes 5 in a plane connected together via reinforcing nanostructure composite joints 9 provided between the edges 7 of the respective pre-preg tape 5.

Figure 9A:
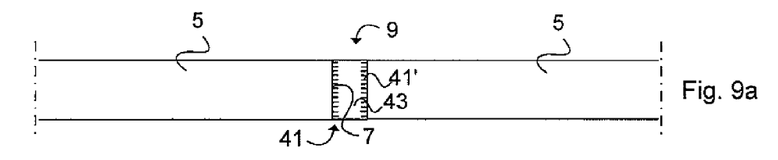
FIGS. 9a-9d illustrate in cross-sections different orientations of a nanostructure being comprised in various types of nanostructure composite joints.

The reinforcing nanostructure composite joints 9 are all comprised of a thermoset polymer including embedded carbon nanofibres (not shown) being oriented perpendicular to an edge surface of the edges 7 of two adjacent pre-preg tapes 5 as being closer illustrated in FIG. 9a.

Figure 2:
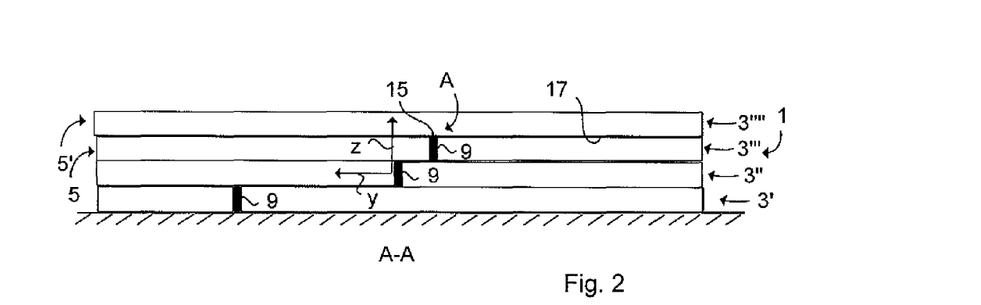
FIG. 2 illustrates a stack comprising the pre-preg tapes in FIG. 1 in a view A-A.
Figure 8:
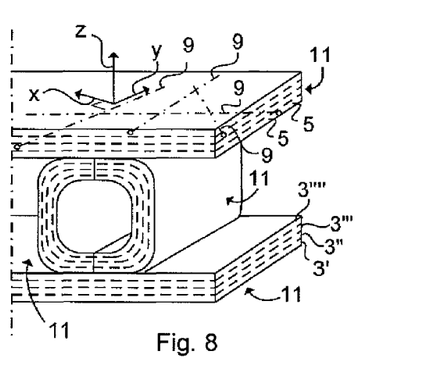
FIG. 8 illustrates in a perspective view four structural composite parts assembled together.

FIG. 2 schematically illustrates the stack 1 in FIG. 1 in a view A-A, i.e. in a cross-section taken perpendicular to the longitudinal direction of the stack 1. The respective nanostructure composite joint 9 is thus shown in a cross section. The FIG. 2 shows the second layer's 3'' middle nanostructure composite joint 9, which for sake of explanation has been marked with z- and a y-directions representing strength properties. By means of the reinforced composite joint 9 being made structural by the nanostructure arranged within the composite joint material, a further on formed and cured finished structural composite part 11 will thereby have a strength in x-, y-, z-direction. The x-direction of strength property is not illustrated in FIG. 2, but extends in a direction perpendicular to the drawing paper. The x-direction is shown in FIG. 8 regarding another nanostructure composite joint 9 of a finished formed structural composite part 11.

Figure 7:
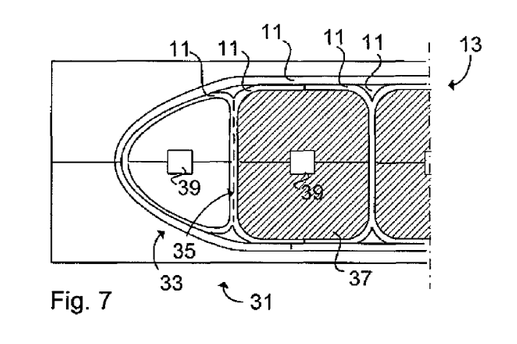
FIG. 7 illustrates a curing tool for the assembly of structural composite parts formed to an aircraft structure.

Prior art structural composite parts can have gaps between the edges 7 of the pre-preg tapes 5. This is because it is very time consuming to lay up pre-preg tapes 5 edge 7 to edge exactly. Therefore gaps are often leaved in a stack, which gaps will weaken the finished structural composite part. By filling the gaps with structural nanostructure composite joints 9, the strength of the laminate of the structural composite part 11, especially in z-direction, will be increased, which strength increases e.g. the impact resistance of the structural composite part 11. The structural nanostructure composite joints 9 also act as crack stoppers preventing cracks to expand in the finished structural composite part 11 of an aircraft structure (not shown). A portion of an aircraft structure 13 is shown in FIG. 7, which illustrates schematically the finishing of an aileron (aircraft structure) being comprised of several beforehand finished and assembled structural composite parts 11.

The FIG. 2 also shows that a joining surface 15 automatically will be provided within an area A of the interface between the main under side 17 of an above placed pre-preg tape 5' and the upper side of a structural nanostructure composite joint 9 (facing the main under side 17 of said upper pre-preg tape 5') of a beneath placed pre-preg tape. That is, a reinforcement will automatically be achieved also between onto each other applied layers 3''', 3'''' via the structural nanostructure composite joints 9 enhancing the strength of the structural composite part 11 and thus enhancing the strength of the aircraft structure 13 as a whole.

Figure 3A:
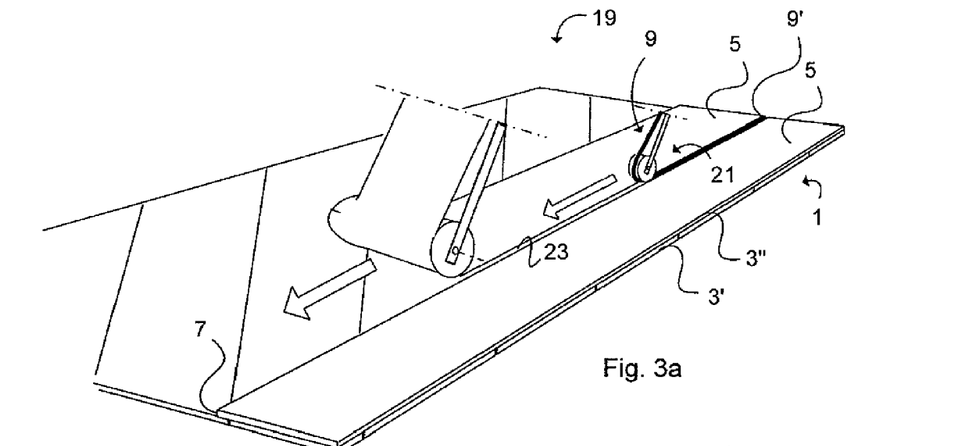
FIG. 3a illustrates an Automatic Tape Laying machine according to a first embodiment.

FIG. 3a illustrates an Automatic Tape Laying (ATL)-machine 19 according to a first embodiment. The function of a common ATL-machine is known in the art. The in FIG. 3a shown machinery is added with a nanostructure composite joint material layer unit 21. A storage reel (not shown) comprising winded nanostructure composite joint 9 material in the form of a nanostructure tape 9' is fed into the gap 23 between two in a common plane earlier laid adjacent pre-preg tapes 5, which have been laid by the main unit ATL 19. After that the main unit ATL 19 has been driven to a predetermined end of the stack 1, the pre-preg tape 5 is cut by a knife (not shown). The main unit ATL 19 is operated to a position at the beginning end of the stack 1 and applies a further strip of pre-preg tape 5 onto the stack 1. For achieving a fast production, the main unit ATL is set to a high speed modus, wherein the gap 23 between two in advance laid pre-preg tapes in a common plane can be allowed wider than that which has to be created by prior art.

The gap 23 between the pre-preg tapes 5 (i.e. between their edges 7) is filled with the nanostructure composite joint 9 material by means of the nanostructure composite joint material layer unit 21. Since the gap 23 is filled with the nanostructure composite joint 9 material, the gap 23 can be at least as wide as the width of the nanostructure tape 9'. The nanostructure composite joint 9 material is set with a low viscosity so that eventual excess will flow out over the joint and covering eventual breach of the tolerance width of the gap 23.

Figure 3B:
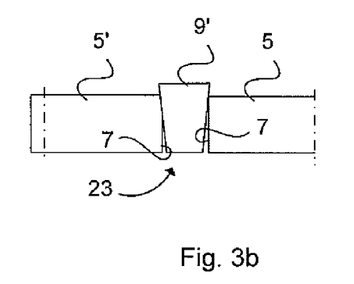
FIG. 3b illustrates a nanostructure tape fed into a gap between two pre-preg tapes.

FIG. 3b illustrates the nanostructure tape 9' fed into the gap 23 with an eventual excess material to be levelled or to fill eventual wider gap (wider than the nanostructure tape width).

The laying up of almost edge 7 edge 7 positioned pre-impregnated fibre plies is thus according to this embodiment followed by applying the nanostructure reinforced composite joint 9 in the gap 23 created between the edges 7 of two adjacent pre-preg tapes 5.

Figure 4:
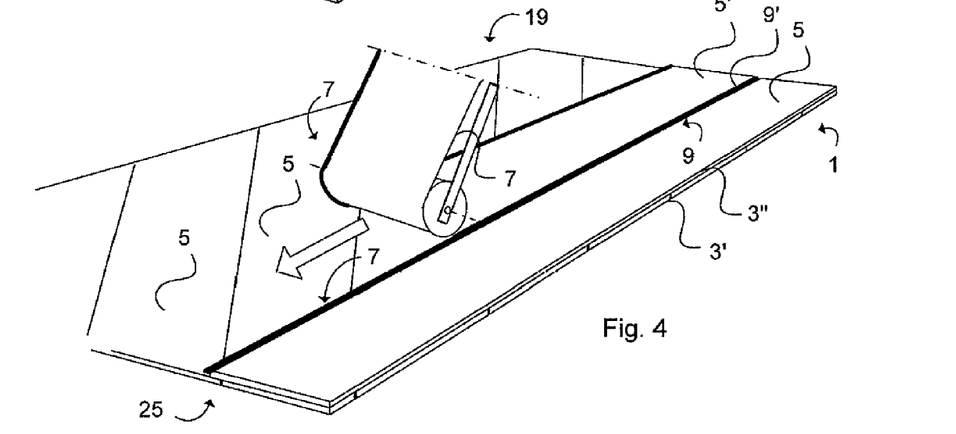
FIG. 4 illustrates an Automatic Tape Laying machine according to a second embodiment.

FIG. 4 illustrates an Automatic Tape Laying machine 19 according to a second embodiment. According to this embodiment the pre-preg tape 5 has been provided with a nanostructure reinforced composite joint 9 material on one prolonged side 25 edge in advance. The nanostructure tape 9' is thus applied onto the pre-preg tape 5 before the latter is applied onto the stack 1. The other prolonged edge of the pre-preg tape 5 does not have any nanostructure tape. The prepared pre-preg tape 5' is laid parallel with an earlier laid prepared pre-preg tape 5 and their edges 7 are thus connected via the nanostructure reinforced composite joint 9 of the earlier laid pre-preg tape 5.

The method of producing the structural composite part 11 made of pre-preg tapes 5 laid-up almost edge 7 edge 7 and onto each other is described as follows. The edges 7 of two adjacent pre-preg tapes 5 are connected via the longitudinal nanostructure reinforced composite joint 9 extending in the longitudinal direction of the edge 7 edge 7 connected pre-preg tapes 5. This is performed by providing the nanostructure reinforced composite joint 9 onto one of the edges 7 of the pre-preg tape 5 to be laid before laying up the latter. A first layer 3' of edge 7 edge 7 positioned pre-impregnated fibre plies (pre-preg tapes 5) is applied. The first layer 3' is provided with the nanostructure reinforced composite joints 9 for connecting the edges 7 of adjacent pre-preg tapes 5. The providing of the nanostructure reinforced composite joint 9 to each pre-preg tape 5 is performed onto one of the edges 7 of the pre-preg tape 5 before laying up the latter edge 7 edge 7 to an earlier laid up pre-preg tape 5, so that the factual pre-preg tapes 5 will be positioned nearly edge 7 edge 7 with the nanostructure reinforced composite joint 9 there between. Thereafter the second layer 3'' of almost edge 7 edge 7 positioned pre-impregnated fibre plies (pre-preg tapes 5) will be laid onto the previous laid up layer 3' wherein the pre-preg tape 5, having the nanostructure reinforced composite joint 9, connects to the adjacent pre-preg tape 5 via the nanostructure reinforced composite joint 9. The second layer 3'' is also provided with said nanostructure reinforced composite joints 9. Each pre-preg tape 5 is provided with the reinforced composite joint 9 onto one of the edges 7 of the pre-preg tapes 5 before laying them up in the stack, so that an adjacent pre-preg tape 5 will be almost edge 7 edge 7 positioned to the adjacent absolute previously laid pre-preg tape 5, with the nanostructure reinforced composite joint 9 positioned there between.

Figure 6:
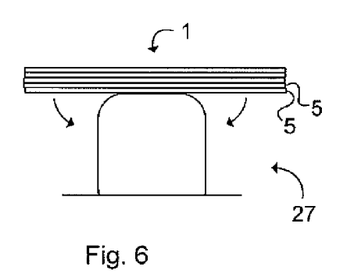
FIG. 6 illustrates a forming of the stack in FIG. 2.
Figure 10A:
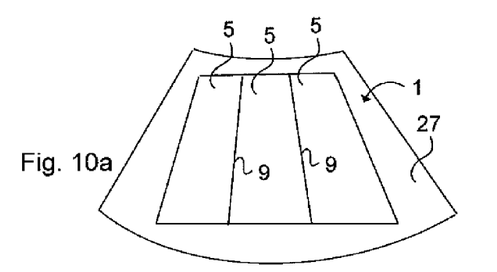
FIG. 10a illustrates from above a forming tool having a conic form with a layer of pre-preg tapes joined via nanostructure composite joints.

When all layers 3', 3'', ... 3'' are laid creating the stack 1 of a predetermined number n of layers 3 comprising pre-preg tapes 5, the stack 1 is moved to a forming tool 27 (see FIG. 6 or 10a). The stack 1 is formed into a predetermined shape over the forming tool 27 by means of a vacuum bag (not shown). The formed stack 1 is then semi-cured and removed after curing, thus constituting the finished structural composite part 11.

Figure 5:
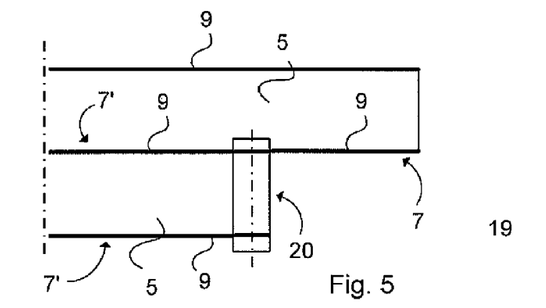
FIG. 5 illustrates a third embodiment of an Automatic Tape Laying machine.

FIG. 5 illustrates a third embodiment of an Automatic Tape Laying machine 19 wherein the stack 1 is created by means of an ATL main unit 20 feeding a pre-preg tape 5 having nanostructure composite joints 9 one both edges 7' of the pre-preg tape 5. The respective pre-preg tape's 5 nanostructure composite joints 9 are flowing into each other when the edges 7 and 7' of the respective pre-preg tape 5 are meeting each other.

FIG. 6 schematically illustrates the forming tool 27. The stack 1 is positioned over the forming tool and are conformed over the forming tool's forming surface, wherein a U-beam is formed. The U-beam is assembled together with other structural composite parts later on for building an aircraft structure, as shown in FIG. 7.

FIG. 7 illustrates a curing tool 31 for the assembly of structural composite parts 11 forming an aircraft structure 13. The structural composite parts 11 are bonded to each other via a bonding interlayer material (not shown) to form the aircraft structure 13. The aircraft structure 13—such as a composite integrated structure—will thus have an optimal impact strength due to the nanostructure reinforced composite joints (not shown) positioned in the gaps between the edges of the adjacent pre-preg tapes (not shown). A shell 33 (structural composite part 11) of a wing (aircraft structure 13) is covering and being bonded to hollow beams 35 (structural composite parts 11). Interior forming tools 37 are inserted in the curing tool 31 for maintaining the form of the aircraft structure 13 during the curing. The interior forming tools 37 are removed after curing by dividing them by loosing wedges 39.

Thereby a method is provided for a cost effective production of high strength structural composite parts 11. The nanostructure reinforced composite joint 9 connected to a pre-preg tape 5 ready to be applied for building a stack 1, means that an aircraft producer can buy "ready to use" pre-preg tapes 5 having a nanostructure composite joint 9 already arranged onto the edge 7 of the pre-preg tape 5. Such an application involves a less complicated ATL-machine without the need of using a complementary nanostructure composite joint material layer unit.

FIG. 8 illustrates in a perspective view four structural composite parts 11 assembled together. In FIG. 8 is schematically illustrated that each structural part 11 comprises four layers 3', 3", 3'", 3"" of pre-preg tapes 5 being formed and cured. Schematically are illustrated four nanostructure reinforced composite joints 9, each of which is applied in one separate layer 3 between the edges 7 of two adjacent pre-preg tapes 5. Of course, there are more nanostructure reinforced composite joints in each structural composite part 11 as shown in FIG. 1. The strength between the edges 7 of two adjacent pre-preg tapes 5 is increased in three dimensions as schematically marked with arrows x, y, z, whereby the total strength of each structural composite part 11, and thus the whole aircraft structure 13, is increased over prior art.

Figure 9B:
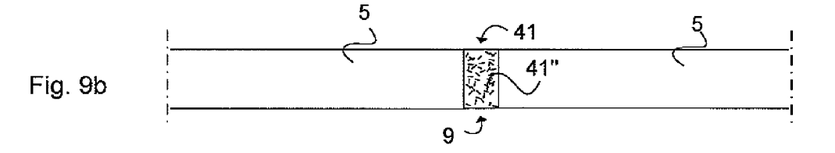
Figure 9C:
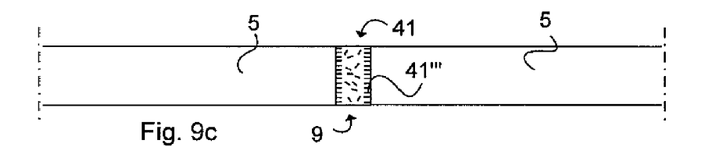

FIGS. 9a-9d illustrate in cross-sections different orientations of a nanostructure 41 being comprised in various types of nanostructure composite joints 9. FIG. 9a schematically illustrates nanotubes 41' embedded in epoxy 43, wherein the prolongations of the nanotubes 41' are perpendicular to the surfaces of the edges 7 of the pre-preg tapes 5. The nanostructure 41 is arranged in the outer zones of the nanostructure composite joint 9 facing the edges 7 for reinforcement of the interface between the nanostructure composite joint 9 and the edge 7 of the each joined pre-preg tape 5. FIG. 9b schematically illustrates nanofibres 41" embedded in epoxy, wherein the prolongations of the nanofibres 41" have various orientations. FIG. 9c schematically illustrates nanofibres 41'" of a diameter of 80-90 nm, preferably 60-110 nm, embedded in resin, wherein a major part of the nanofibres 41'" are located primarily in the outer zones of the nanostructure composite joint 9 and a less part in a centre part. The resin provides a satisfactory conformability of the stack (not shown) to be formed.

Figure 9D:
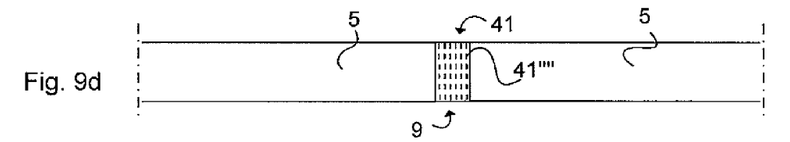

In FIG. 9d is illustrated that the nanostructure is oriented i z-direction, i.e. parallel with the edge surface of the pre-preg tape 5. The composite joint is thus arranged with a suitable fibre direction (i.e. perpendicular against the plane of a wing shell) in the laminate for conducting electricity and/or heat transverse the shell. A method is performed for producing a laminate comprising the structural composite joints between the pre-preg tapes, wherein the joints have epoxy material comprising a nanostructure being oriented in said z-direction for creating conductive ways in i.e. a wing shell, that is conductive ways extending transverse the shell plane. A cost effective production method is thus achieved for the leading of heat to the outside of an aircraft shell from the interior.

Figure 10B:
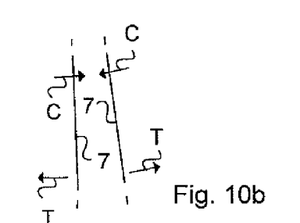

FIG. 10a illustrates from above a forming tool 27 having a conic form with a layer 3 of pre-preg tapes 5 joined via nanostructure composite joints 9. Since the nanostructure composite joints 9 are made viscous, the blank or stack 1 can be easy formed over a double curved forming surface of the forming tool 27 due to the gliding effect and the possible compression and tension of the nanostructure composite joint 9, more closely schematically illustrated in FIG. 10b. FIG. 10b illustrates an exaggerated view of two joined edges 7 of two adjacent pre-preg tapes 5 in FIG. 10a. The compression and tension movements are schematically illustrated with arrows C and T.

Figure 11:
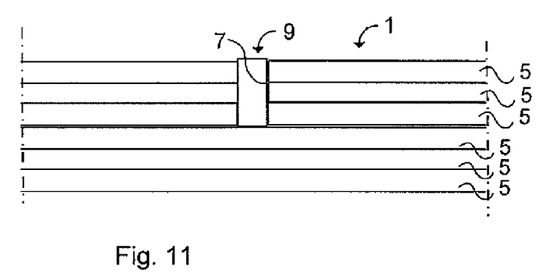
FIG. 11 illustrates a portion of a stack comprising a lay-up of tripple pre-preg tapes connected via a nanostructure composite joint to an adjacent lay-up of tripple pre-preg tapes.

FIG. 11 illustrates a portion of a stack 1 in cross-section taken perpendicular to the plane of a lay-up of tripple pre-preg tapes 5 connected via a nanostructure composite joint 9 to an adjacent lay-up of tripple pre-preg tapes 5. There is also a possibility, by means of the reinforcing nanostructure composite joint 9 between two edges 7 and due to a thereby reinforced structure of the laminate, to increase the thickness of each layer of pre-preg tapes 5. The production time can therefore be even more shorter. Instead of for example sixteen layers a structural composite part 11 having eight thicker layers can be achieved in a cost-effective manner, still having the similar strength.

The longitudinal structural nanostructure composite joint 9 can be in the form of tape, paste, film adhesive and can be comprised of different types of polymer materials, such as polymer resins, epoxy, polymides, bismaleimides, phenolics, Cyanatester, PEEK, PPS, Polyester, Vinylester, polyamids, polypropylene etc. and mixtures thereof, including embedded therein different types of nanostructures, such as nanofibres, nanotubes, nanowires, all of various types of material such as carbon, ceramic, metal, organic, glass etc.

The pre-preg tapes can be in the form of resin impregnated fibres. The resin could be thermosetting resins such as epoxy, polyester, cyanate ester, vinyl ester, BMI (bismaleimide), or thermoplastics such as PPS (poly-phenylene sulfide), PEI (polyethylene imide), PEEK (polyetheretherketone). The pre-preg tape fibres are for example carbon fibres, glass fibres, organic fibres and ceramic fibres.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. The orientation of the nanostructure in the longitudinal composite joint (9) can be unidirectional and/or random oriented and the nanostructure can consist of nanotubes and/or nanofibres and/or nanowires. The unidirectional direction can be in z-, x-, y-directions, either solely or in combination. The nanostructure material can be any of the groups; carbon, ceramic, metal, organic, cellulosic fibres.

The invention claimed is:

1. A structural composite part, comprising:
   pre-impregnated fiber plies laid-up in a plurality of layers, wherein in each layer adjacent fiber plies are laid up almost edge-to-edge,
   a longitudinal composite joint extending in the plane in a longitudinal direction of at least two of the edge-to-edge connected fiber plies and connecting edges of at least two of the adjacent fiber plies, and
   a nanostructure arranged within the composite joint, the nanostructure making the composite joint a structural part of the composite part.

2. The structural composite part according to claim 1, wherein the nanostructure primarily is arranged in an outer zone of the composite joint for reinforcement of the interface between the composite joint and the edge of the adjacent joined fiber ply.

3. The structural composite part according to claim 1, wherein the nanostructure comprises nonofibers.

4. The structural composite part according to claim 1, wherein the nanostructure comprises nanotubes.

5. The structural composite part according to claim 1, wherein the nanostructure comprises nanowires.

6. The structural composite part according to claim 1, wherein the nanostructure has an unidirectional orientation.

7. The structural composite part according to claim 6, wherein the nanostructure has orientation in z-direction.

8. The structural composite part according to claim 6, wherein the nanostructure is oriented perpendicular against the edge of the adjacent joined fiber ply.

9. The structural composite part according to claim 1, wherein the nanostructure is oriented randomly.

* * * * *